US008902107B2

(12) United States Patent
Luke et al.

(10) Patent No.: US 8,902,107 B2
(45) Date of Patent: Dec. 2, 2014

(54) MOBILE COMMUNICATION DEVICE (75) Inventors: Hok-Sum Horace Luke, Taoyuan County (TW); Chih-Ling Chien, Taoyuan County (TW); Hung-Yi Huang, Taoyuan County (TW); Chung-Ting Hung, Taoyuan County (TW); Chien-Chun Cheng, Taoyuan County (TW); Chih-Hsien Wu, Taoyuan County (TW); Kuo-Cheng Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 535 days.

(21) Appl. No.: 12/689,218

(22) Filed: Jan. 18, 2010

(65) Prior Publication Data

US 2010/0302108 A1 Dec. 2, 2010

(30) Foreign Application Priority Data

May 26, 2009 (TW) .............................. 98117456 A (51) Int. Cl.
| | | |
|---|---|---|
| *H01Q 1/24* | (2006.01) | |
| *H04B 1/38* | (2006.01) | |
| *H04M 1/02* | (2006.01) | |
| *G06F 1/16* | (2006.01) | |
| *H01Q 9/04* | (2006.01) | |

(52) U.S. Cl.
CPC ........... *H04M 1/0202* (2013.01); *G06F 1/1626* (2013.01); *G06F 1/1698* (2013.01); *H01Q 1/243* (2013.01); *H01Q 9/0421* (2013.01); *H04M 1/0279* (2013.01)
USPC ......................................... 343/702; 455/575.7

(58) Field of Classification Search
USPC ..................... 343/702, 846; 455/575.1, 575.7
See application file for complete search history.

(56) References Cited

U.S. PATENT DOCUMENTS

| | | | | |
|---|---|---|---|---|
| 6,741,215 | B2 * | 5/2004 | Grant et al. .................... | 343/702 |
| 7,132,987 | B1 * | 11/2006 | Olsson et al. ................. | 343/702 |
| 7,642,968 | B2 * | 1/2010 | Minard et al. ................ | 343/702 |
| 2004/0204121 | A1 | 10/2004 | Risheq | |
| 2005/0280585 | A1 | 12/2005 | Scarpelli et al. | |
| 2008/0316121 | A1 | 12/2008 | Hobson et al. | |

FOREIGN PATENT DOCUMENTS

| | | |
|---|---|---|
| CN | 1543713 | 11/2004 |
| CN | 101364663 | 2/2009 |

(Continued)

OTHER PUBLICATIONS

"European Search Report of European Counterpart Application", issued on Jun. 10, 2010, p. 1-p. 8.
"First Office Action of China Counterpart Application", issued on Jul. 16, 2012, p. 1-p. 5.

(Continued)

*Primary Examiner* — Michael C Wimer
(74) *Attorney, Agent, or Firm* — Jianq Chyun IP Office (57) ABSTRACT

A mobile communication device including a first appearance and an antenna is provided. An upper surface of the first appearance is bent a first angle from a border between a display area and a non-display area toward a display direction, and a lower surface of the first appearance is bent a second angle from a bending point toward the display direction, wherein the bending point of the lower surface is corresponding to the display area of the upper surface. The antenna is disposed in the mobile communication device and corresponding to the non-display area of the first appearance. The antenna transmits and receives signals processed by the mobile communication device.

10 Claims, 7 Drawing Sheets

(56) References Cited

FOREIGN PATENT DOCUMENTS

| | | |
|---|---|---|
| CN | 101399393 | 4/2009 |
| EP | 1511183 | 3/2005 |
| EP | 2045871 | 4/2009 |
| JP | 2007180660 | 7/2007 |
| TW | 553505 | 9/2003 |

OTHER PUBLICATIONS

"Second Office Action of China Counterpart Application", issued on Feb. 20, 2013, p. 1-p. 6.

"Office Action of Taiwan counterpart application" issued on Nov. 9, 2012, pp. 1-5.

* cited by examiner

MOBILE COMMUNICATION DEVICE

CROSS-REFERENCE TO RELATED APPLICATION

This application claims the priority benefit of Taiwan application serial No. 98117456, filed on May 26, 2009. The entirety of the above-mentioned patent application is hereby incorporated by reference herein and made a part of this specification.

BACKGROUND OF THE INVENTION

1. Field of the Invention

The present invention generally relates to a mobile communication device, and more particularly, to a mobile communication device with bent appearances.

2. Description of Related Art

Nowadays, wireless communication plays a crucial role in our daily life. As a result, different mobile communication devices (such as cell phones, smart phones, multimedia players, personal digital assistants (PDAs), and satellite navigators, etc) are broadly used. Many small-sized mobile electronic devices have been developed and become indispensable in our daily life.

Generally speaking, a mobile communication device receives a signal through its antenna. Then, the antenna transmits the received signal to an internal circuit of the mobile communication device. After that, the internal circuit performs a series of processes to the received signal. It should be noted that the electromagnetic wave radiated from the antenna is hazardous to the human beings. Thus, the Federal Communications Commission (FCC) specifies a specific absorption ratio (SAR) of mobile communication device in order to limit the maximum energy radiated from a mobile communication device.

However, it is very difficult to improve the SAR of a mobile communication device to satisfy the related regulation due to the limitations in the internal space of the mobile communication device and the design or disposition of the antenna. Besides, when a user uses a mobile communication device, the user's hand may attach to the antenna area of the mobile communication device. As a result, the dielectric value $\in_r$ of the surrounding environment in which the antenna transmits and receives signals may be changed, and accordingly frequency shift and noises may be produced. More importantly, the frequency shift and noises may affect the communication quality of the mobile communication device. Thereby, how to design the antenna to satisfy the related SAR regulation and reduce frequency shift and noise to ensure the communication quality is one of the major subjects while designing a mobile communication device.

SUMMARY OF THE INVENTION

Accordingly, the present invention is directed to a mobile communication device, wherein bent appearances are adopted and an antenna is correspondingly disposed so that the related regulation of specific absorption ratio (SAR) of the mobile communication device is satisfied, frequency shift and noises are reduced, and the communication quality of the mobile communication device is improved.

The present invention provides a mobile communication device including a first appearance and an antenna. An upper surface of the first appearance is bent a first angle from a border between a display area and a non-display area toward a display direction, and a lower surface of the first appearance is bent a second angle from a bending point toward the display direction, wherein the bending point of the lower surface is corresponding to the display area of the upper surface. The antenna is disposed in the mobile communication device and corresponding to the non-display area of the first appearance. The antenna transmits a signal processed by the mobile communication device.

According to an embodiment of the present invention, the mobile communication device further includes an antenna carrier and a second appearance. The antenna carrier is bent the second angle along the lower surface of the first appearance, and a first surface of the antenna carrier carries the antenna. The second appearance is bent the second angle along the lower surface of the first appearance and corresponds to the first surface of the antenna carrier, so as to form a chamber with the first appearance for containing the antenna carrier. The second appearance is locked to the first appearance. The antenna carrier has a battery containing slot corresponding to the display area.

According to an embodiment of the present invention, the antenna includes a body part, an extending part, a ground part, and a feeding part. The body part covers the first surface of the antenna carrier. The extending part is electrically connected to the body part and penetrates the antenna carrier to be extended from the first surface of the antenna carrier to a second surface of the antenna carrier. The ground part and the feeding part are formed at the end of the extending part and are respectively electrically connected to the body part through the extending part.

According to an embodiment of the present invention, the mobile communication device further includes a first substrate and a second substrate. The first substrate is disposed in the chamber and corresponds to the second surface of the antenna carrier. A system ground surface is formed and at least two contact springs are disposed on the first substrate, wherein the two contact springs are respectively electrically connected to the ground part and the feeding part. The second substrate is disposed in the chamber and corresponds to the second surface of the antenna carrier, and the second substrate engages with the first substrate along the second surface of the antenna carrier.

As described above, in the present invention, bent appearances are adopted and an antenna is correspondingly disposed, so as to avoid the situation that a user's hand attaches to an antenna radiating area. Thereby, the radiating area of the mobile communication device in the present invention will not be blocked by the user's hand when the user uses the mobile communication device. Compared to the conventional techniques, the mobile communication device in the present invention has better communication quality and reduced frequency shift.

BRIEF DESCRIPTION OF THE DRAWINGS

The accompanying drawings are included to provide a further understanding of the invention, and are incorporated in and constitute a part of this regulation. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
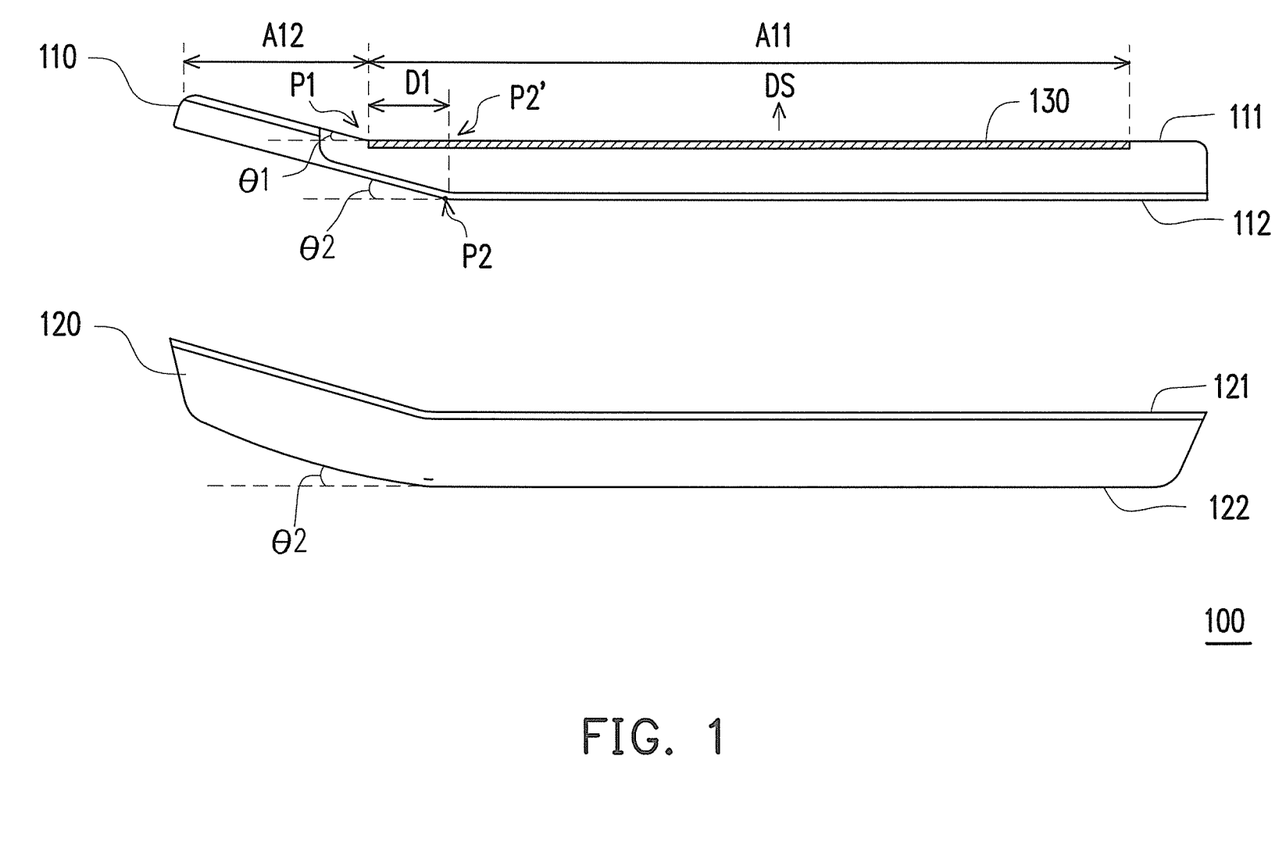
FIG. 1 is a diagram illustrating the appearance of a mobile communication device according to an embodiment of the present invention.

FIG. 1 is a diagram illustrating the appearance of a mobile communication device according to an embodiment of the present invention. Referring to FIG. 1, the mobile communication device 100 includes a first appearance 110 (e.g. first housing), a second appearance 120 e.g. second housing, and a display panel 130. The mobile communication device 100 may be a PDA phone, a smart phone, a satellite navigator, or a personal digital assistant (PDA). Besides, the first appearance 110 and the second appearance 120 may be implemented as a housing or parts of a housing, such as a back cover or a battery cover.

Referring to FIG. 1 again, the first appearance 110 has an upper surface 111 and a lower surface 112. The upper surface 111 of the first appearance 110 is further divided into a display area A11 and a non-display area A12, wherein a display panel 130 is disposed within the display area A11, and a plurality of control keys (not shown, such as buttons, multi-directional navigation keys, track balls, or any other input or control elements which can communicate with the mobile communication device 100) is disposed within the non-display area A12. It should be noted that both the upper surface 111 and the lower surface 112 of the first appearance 110 have special curving designs, and the second appearance 120 is overlapped and engaged with the first appearance 110 along the curving of the lower surface 112 of the first appearance 110.

The upper surface 111 of the first appearance 110 is bent a first angle Θ1 from a border P1, between the display area A11 and the non-display area A12, toward a display direction DS of the display panel 130. The lower surface 112 of the first appearance 110 is bent a second angle Θ2 from a bending point P2 toward the display direction DS of the display panel 130. The bending point P2 of the lower surface 112 is projected at a projection point P2' on the upper surface 111 along the display direction DS, wherein the projection point P2' is located within the display area A11. Thus, in an actual implementation, the second angle Θ2 is greater than the first angle Θ1.

For example, the first angle Θ1 is 15°, and the second angle Θ2 is 18°. Besides, the distance D1, between the bending point (the border P1) of the upper surface 111 and the projection point P2' corresponding to the bending point P2 of the lower surface 112, is between 5 mm and 8 mm. On the other hand, one end of the second appearance 120 is bent the second angle Θ2 along the lower surface 112 of the first appearance 110, and an upper surface 121 and a lower surface 122 at another end of the second appearance 120 are approximately parallel to each other. Thus, the second appearance 120 overlaps the first appearance 110 to form a chamber for accommodating internal elements of the mobile communication device 100.

Figure 2:
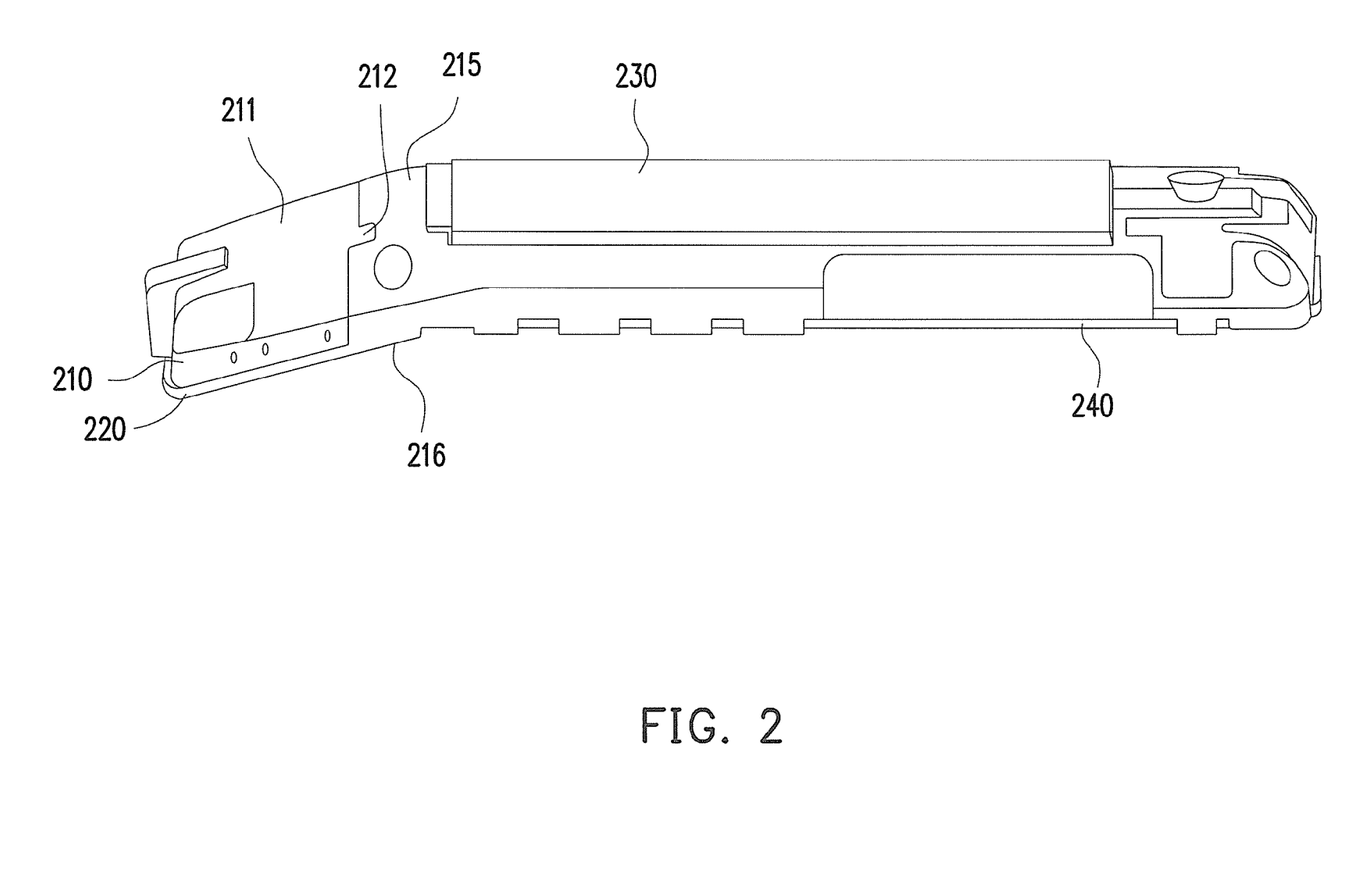
FIG. 2 is a diagram illustrating the internal structure of a mobile communication device according to an embodiment of the present invention.

The internal elements of the mobile communication device 100 will be described herein in order to allow those having ordinary knowledge in the art to further understand the present embodiment. FIG. 2 is a diagram illustrating the internal structure of a mobile communication device according to an embodiment of the present invention. Referring to FIG. 2, the mobile communication device 100 further includes an antenna 210, an antenna carrier 220, a battery containing slot 230, and a first substrate 240.

The antenna carrier 220 carries the antenna 210 and has the battery containing slot 230 for placing batteries. Besides, the antenna carrier 220 and the first substrate 240 are placed in the chamber formed by the first appearance 110 and the second appearance 120. It should be noted that with the special curving design of the first appearance 110, the antenna carrier 220 is also bent the second angle Θ2 along the lower surface 112 of the first appearance 110.

Figure 3:
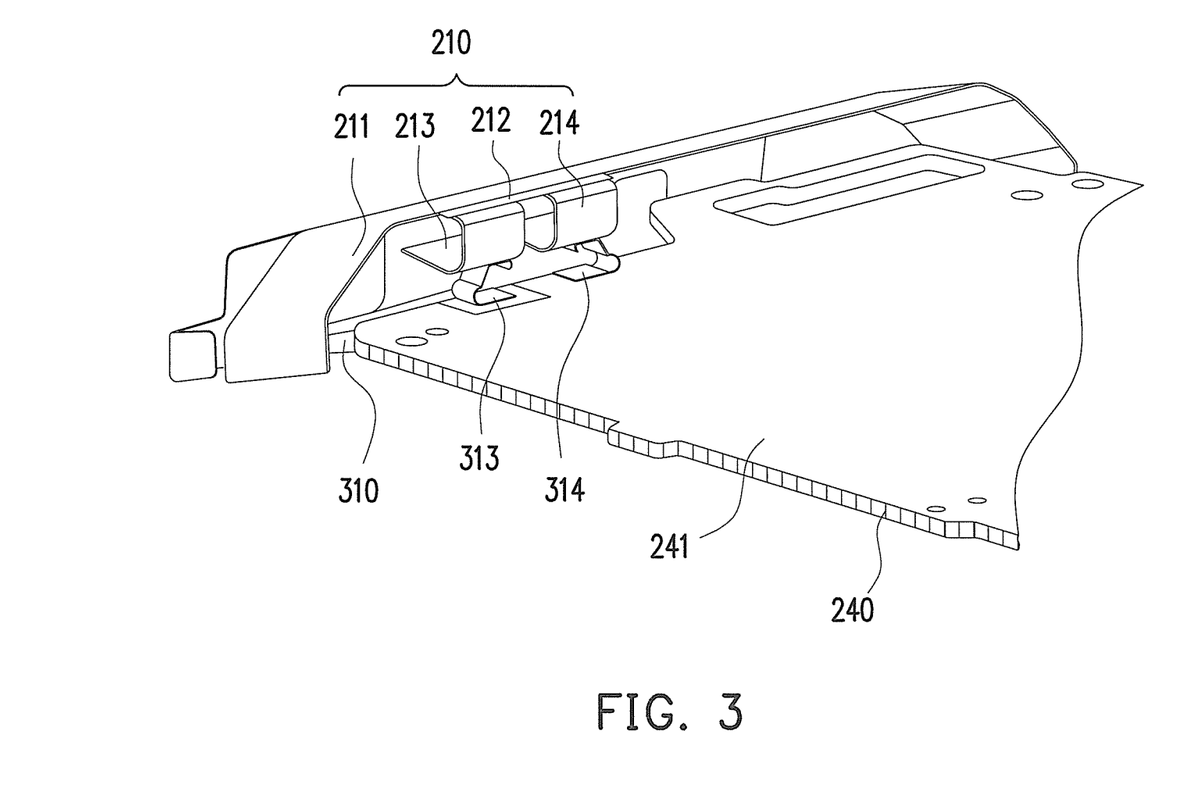
FIG. 3 illustrates the relative disposition of an antenna carrier, an antenna, and substrates according to an embodiment of the present invention.

FIG. 3 illustrates the relative disposition of an antenna carrier, an antenna, and substrates according to an embodiment of the present invention. Referring to both FIG. 2 and FIG. 3, the antenna 210 includes a body part 211, an extending part 212, a feeding part 213, and a ground part 214. The body part 211 of the antenna 210 covers a first surface 215 of the antenna carrier 220. The extending part 212 of the antenna 210 is electrically connected to the body part 211 and penetrates the antenna carrier 220.

As shown in FIG. 3, the extending part 212 of the antenna 210 presents an "n" shaped curvature, so as to be extended from the first surface 215 of the antenna carrier 220 to a second surface 216 thereof. Accordingly, part of the extending part 212 covers the second surface 216 of the antenna carrier 220, wherein the feeding part 213 and the ground part 214 are formed at the end of the extending part 212, and the feeding part 213 and the ground part 214 are respectively electrically connected to the body part 211 through the extending part 212. On the other hand, the first substrate 240 faces the second surface 216 of the antenna carrier 220, and a system ground surface 241 is formed and at least two metal pads are disposed on the first substrate 240, wherein the two metal pads are respectively electrically connect to the feeding part 213 and the ground part 214. In the present embodiment, the metal pads are contact springs. However, the present invention is not limited thereto, and other electronic elements (not shown) in the mobile communication device 100 may also be disposed on the first substrate 240, wherein a contact spring 313 is electrically connected to the feeding part 213, and a contact spring 314 is electrically connected to the ground part 214.

In the present embodiment, the first substrate 240 crosses over the bending point of the antenna carrier 220 and is electrically connected to the ground part 214 and the feeding part 213 of the antenna 210 through the two contact springs. Thus, the system ground surface 241 and other electronic elements disposed on the first substrate 240 can be respectively electrically connected to the ground part 214 and the feeding part 213 of the antenna 210, so that the mobile communication device 100 can radiate a signal processed by its internal electronic elements through the antenna 210 (i.e., radiating area). Obviously, the mobile communication device 100 can also receive a signal through the antenna 210 and then performs a series of processes to the signal. In addition, as shown in FIG. 3, the mobile communication device 100 further includes a second substrate 310. The second substrate 310 faces the second surface 216 of the antenna carrier 220 and is engaged with the first substrate 240 along the second surface 216 of the antenna carrier 220.

More space is provided for disposing internal electronic elements of the mobile communication device 100 through the disposition of the second substrate 310. Besides, the relative disposition of the first substrate 240, the second substrate 310, and the antenna 210 illustrated in FIG. 3 is not intended to limiting the present invention. For example, changes in the lengths of the first substrate 240 and the second substrate 310 may cause the sizes of the first substrate 240 and the second substrate 310 to change. Along with the decrease in the length of the first substrate 240 and the increase in the length of the second substrate 310, the ground part 214 and the feeding part 213 of the antenna 210 can be directly electrically connected to the second substrate 310 and then connected to the first substrate 240 through the second substrate 310. In this case, the system ground surface 241 may be disposed on the second substrate 310, and the first substrate 240 which originally crosses over the bending point of the antenna carrier 220 may be changed to the second substrate 310.

Figure 4:
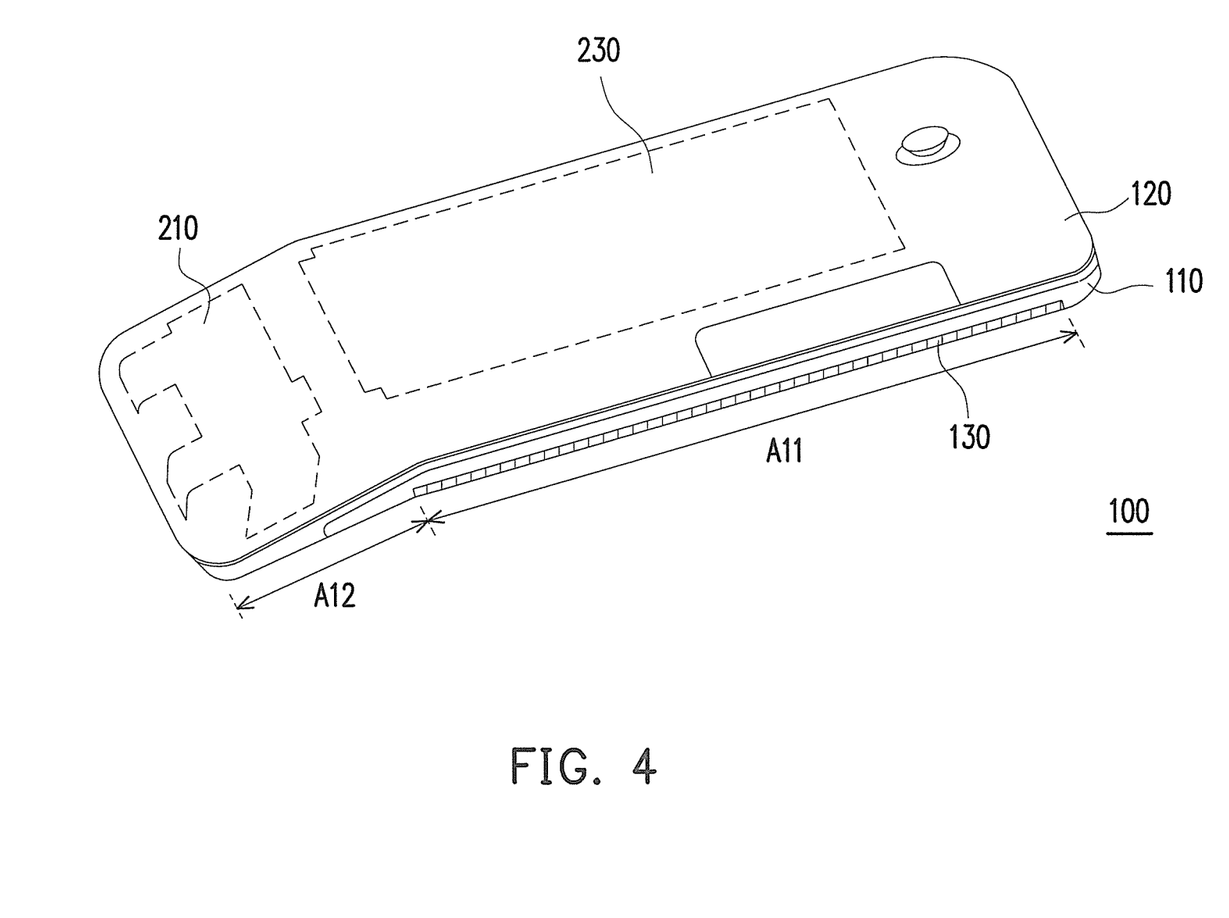
FIG. 4 illustrates the assembled structure of a mobile communication device according to an embodiment of the present invention.

FIG. 4 illustrates the assembled structure of a mobile communication device according to an embodiment of the present invention, wherein the internal elements of the mobile communication device are illustrated with dotted lines. Referring to FIG. 1, FIG. 2, and FIG. 4, the second appearance 120 is locked to the first appearance 110 and foams a chamber with the first appearance 110 for accommodating the antenna carrier 220 and other electronic elements (not shown). Besides, the antenna carrier 220 is disposed by facing the second appearance 120 toward the first surface 215 of the antenna carrier 220. Thus, as shown in FIG. 4, both the antenna 210 and the battery containing slot 230 disposed on the first surface 215 of the antenna carrier 220 are opposite to the second appearance 120. In addition, the antenna 210 is disposed in the mobile communication device 100 by the way of corresponding to the non-display area A12 of the first appearance 110, and the battery containing slot 230 is corresponding to the display area A11 of the first appearance 110.

Regarding the assembled structure of the mobile communication device 100, the upper surface 111 of the first appearance 110 is the front surface of the mobile communication device 100, and the lower surface 122 of the second appearance 120 is the back surface of the mobile communication device 100. With the special curving design of the first appearance 110 and the second appearance 120, the front surface of the mobile communication device 100 is bent a first angle $\Theta 1$ upwards from the horizontal plane, the back surface thereof is bent a second angle $\Theta 2$ upwards from the horizontal plane, and the antenna 210 is disposed close to the back surface of the mobile communication device 100.

It should be mentioned that because both the front surface and back surface of the mobile communication device 100 have the special curving design and the antenna 210 is disposed close to the back surface of the mobile communication device 100, the specific absorption ratio (SAR) of the mobile communication device 100 satisfies both front side measurement regulation and back side measurement regulation.

Regarding the measurement of the SAR, the energy radiated from a mobile communication device and absorbed by a human body is usually measured at about 1.5 cm away from the human body by using a measurement device. The SAR is defined as the power absorbed during a unit time by a unit mass, and the unit thereof is W/kg. In addition, regarding the related regulations of SAR value, ANSI/IEEE specifies that the electromagnetic wave received by 1 gram of human organ should not exceed 1.6 W/kg, and the European regulation specifies that the electromagnetic wave received by 10 grams of human organ should not exceed 2.0 W/kg.

Figure 5:
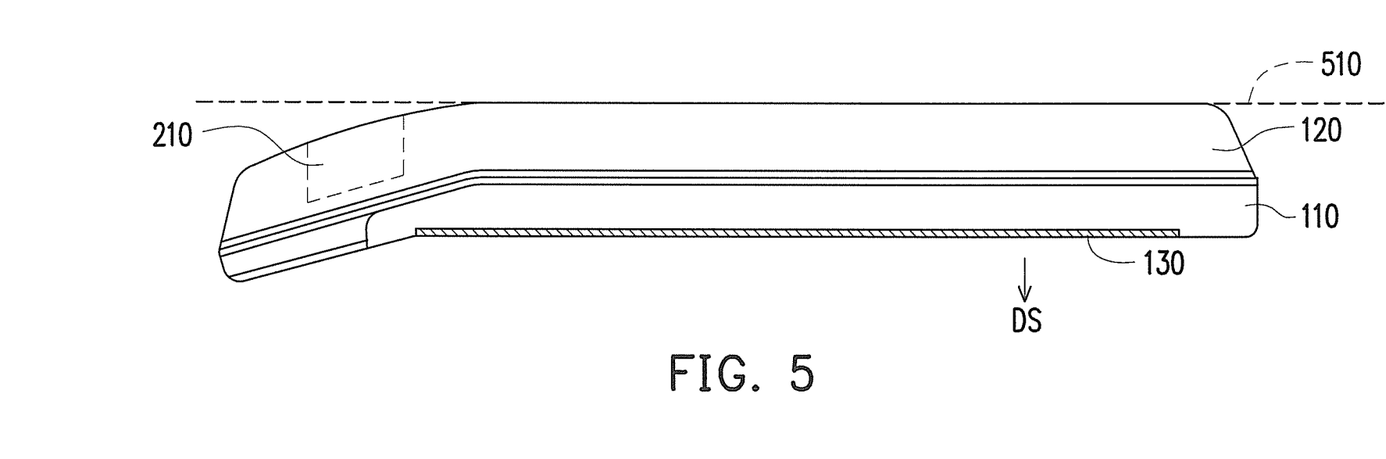
FIG. 5 illustrates the back side measurement of a mobile communication device according to an embodiment of the present invention.

The mobile communication device 100 can meet both the front side and back side measurement regulations because the SAR is always measured at the highest point in front or back of the mobile communication device 100 and 1.5 cm away from the human body. FIG. 5 illustrates the back side measurement of a mobile communication device according to an embodiment of the present invention. Referring to FIG. 5, the measurement device performs the back side measurement based on a measurement reference line 510. Herein, because the back surface of the mobile communication device 100 is bent a second angle toward the display direction DS of the display panel 130, the antenna 210 is far away from the measurement reference line 510. Thus, the distance between the antenna 210 and the human body must be greater than 1.5 cm, so that the SAR measured by the measurement device must meet the regulation.

Figure 6:
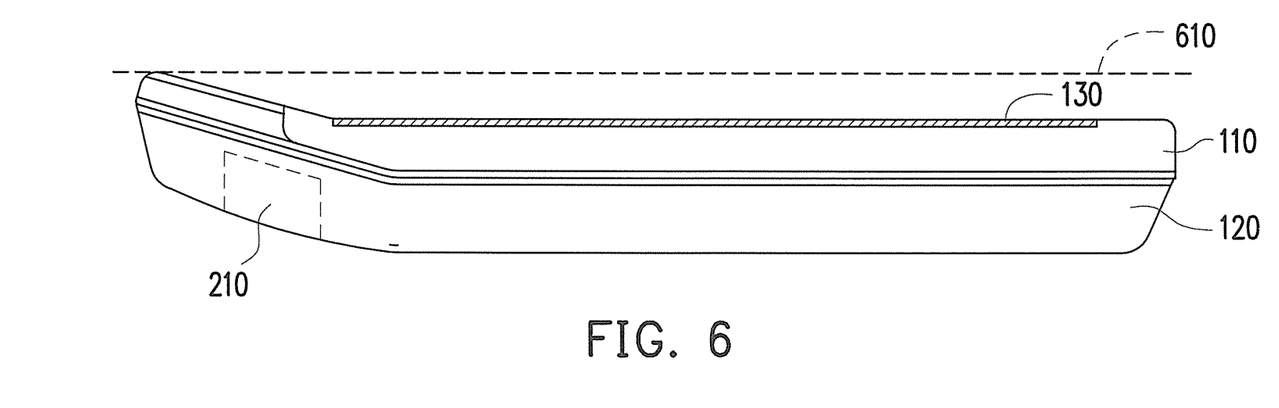
FIG. 6 illustrates the front side measurement of a mobile communication device according to an embodiment of the present invention.

FIG. 6 illustrates the front side measurement of a mobile communication device according to an embodiment of the present invention. Referring to FIG. 6, the measurement device performs the front side measurement based on a measurement reference line 610. Herein the measurement reference line 610 falls on the end of the bending structure of the first appearance 110, and the antenna 210 is disposed close to the second appearance 120 (considered as the back surface of the mobile communication device 100). Thus, the SAR measured by the measurement device meets the general regulation. Compared to a general device without the bending structure, the mobile communication device 100 provides a front side SAR value at least equivalent to the average value of the general device.

In an actual user's scenario, when a user holds the mobile communication device 100 by hand, the user's hand will not attach to the radiating area above or around the antenna 210 due to the special curving design of the appearances. In this case, the atmosphere around the antenna 210 (radiating area) is not blocked by the user's hand and can make circulation freely, so that the average dielectric value $\in_r$ around the antenna 210 (radiating area) is close to 1. Accordingly, the frequency shift on the antenna 210 caused by the holding condition of the user is effectively reduced. The closer the dielectric value equals to 1, the less affection the frequency shift produces. However, if the mobile communication device 100 does not have the bending structure, the user's hand is very close to the area in which the antenna 210 transmits and receives signals. Since the user's hand also has different dielectric value and which is greater than that of the atmosphere, the average dielectric value greatly exceeds the ideal condition (the dielectric value of the air is 1). In this case, serious frequency shift will be produced when the antenna 210 receives and transmits signals in such an environment.

Figure 7:
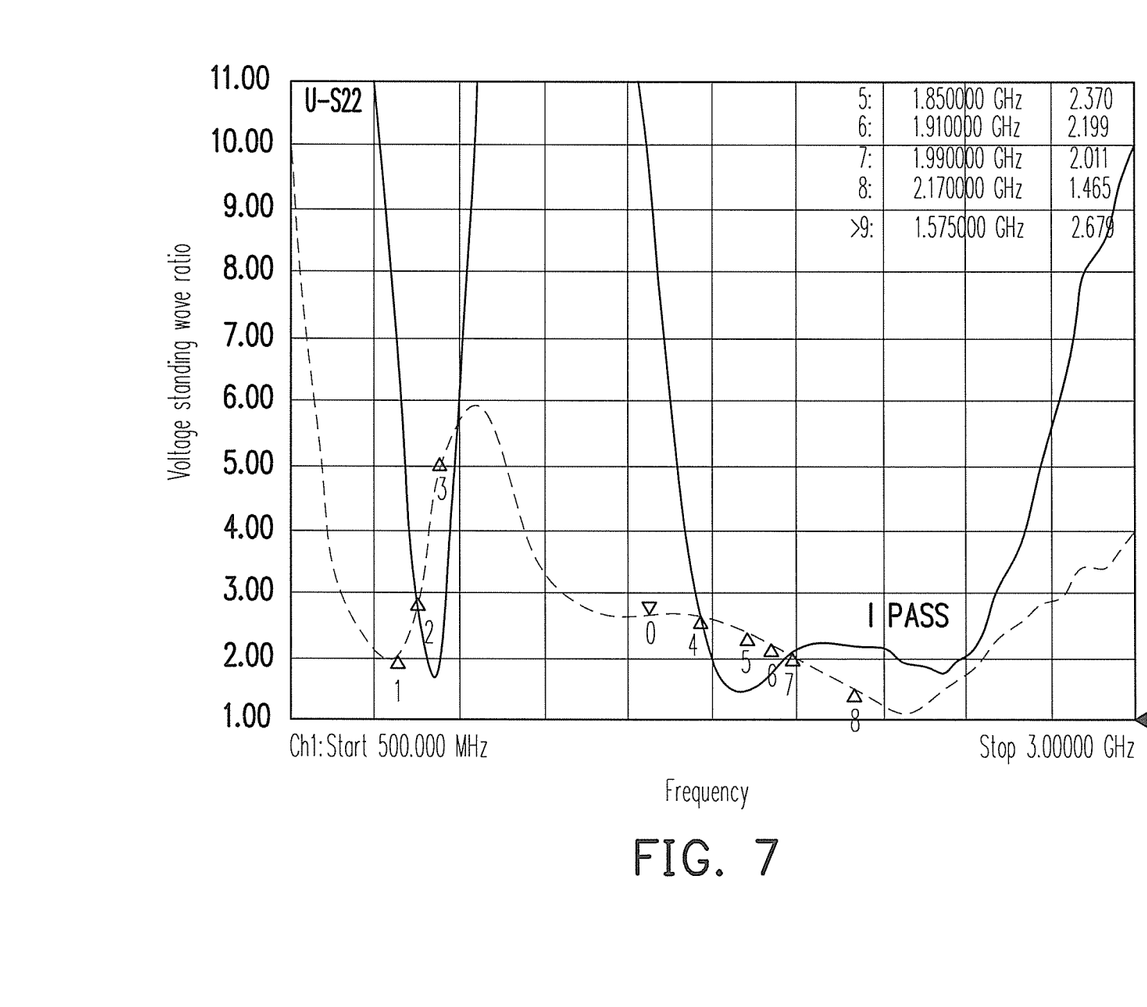
FIG. 7 illustrates the voltage standing wave ratio (VSWR) of a device without a bending structure when the device is held by a user.
Figure 8:
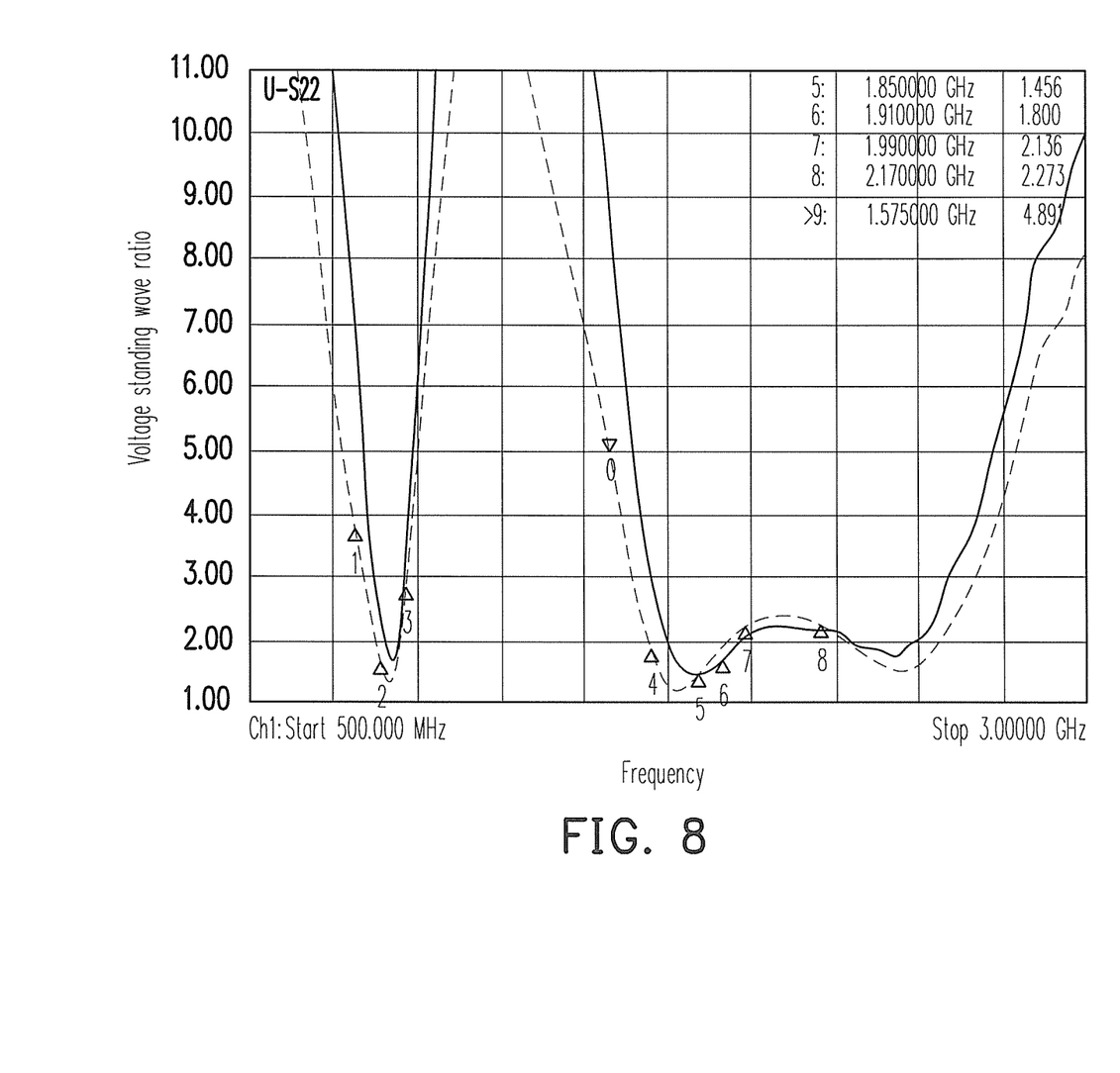
FIG. 8 illustrates the VSWR of a mobile communication device when the mobile communication device is held by a user according to an embodiment of the present invention.

FIG. 7 illustrates the voltage standing wave ratio (VSWR) of a device without a bending structure when the device is held by a user, and FIG. 8 illustrates the VSWR of a mobile communication device when the mobile communication device is held by a user according to an embodiment of the present invention, wherein the solid lines represent the VSWR measured under the ideal condition when the devices are not held by the user, and the dotted lines represent the VSWR measured when the devices are held by the user.

Referring to FIG. 7, the antenna has significant different VSWR and serious frequency shift is produced when the device without the bending structure is held and not held by the user. Thus, the communication quality of the device is under the basic requirement. Referring to FIG. 8, the antenna has similar VSWR when the mobile communication device with the bending structure is held and not held by the user. Thus, the communication quality of the mobile communication device is very good.

As described above, in the present invention, appearances with bending structures are adopted and an antenna is correspondingly disposed, so that the situation that a user's hand attaches to the area above and around the antenna is avoided. Thus, when the mobile communication device is actually used, the radiation from the antenna will not be blocked by the user's hand, so that the SAR of the mobile communication device can be effectively reduced and the communication quality thereof can be improved. More importantly, the bending structures of the appearances adopted in the present invention are designed according to the design concepts of ergonomics, so that the user can operate the mobile communication device more conveniently.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile communication device, comprising:
   a first housing;
   a display panel, dividing the first housing into a display area and a non-display area, wherein an upper surface of the first housing is bent at a first angle from a border between the display area and the non-display area toward a display direction of the display panel, a lower surface of the first housing is bent at a second angle from a bending point toward the display direction, and the bending point is opposite to the display area;
   an antenna, opposite to the display area with respect to a direction perpendicular to the display direction, for transmitting a signal processed by the mobile communication device;
   an antenna carrier, bent at the second angle along the lower surface of the first housing, wherein a first surface of the antenna carrier carries the antenna; and
   a second housing, bent at the second angle along the lower surface of the first housing, and opposite to the first surface of the antenna carrier, wherein the antenna carrier is disposed in a chamber formed by the first housing and the second housing.

2. The mobile communication device according to claim 1, wherein the second housing is locked to the first housing.

3. The mobile communication device according to claim 1, wherein the antenna carrier has a battery containing slot opposite to the non-display area with respect to the direction perpendicular to the display direction.

4. The mobile communication device according to claim 1, wherein the antenna comprises:
   a body part, for covering the first surface of the antenna carrier; and
   an extending part, electrically connected to the body part, and penetrating the antenna carrier to be extended from the first surface of the antenna carrier to a second surface of the antenna carrier,
   wherein a ground part and a feeding part are formed at an end of the extending part, and the ground part and the feeding part are respectively electrically connected to the body part through the extending part.

5. The mobile communication device according to claim 4 further comprising:
   a first substrate, disposed in the chamber, and opposite to the second surface of the antenna carrier with respect to the display direction, wherein a system ground surface is formed and at least two contact springs are disposed on the first substrate, and the contact springs are respectively electrically connected to the ground part and the feeding part.

6. The mobile communication device according to claim 5, wherein the first substrate crosses over a bending point of the antenna carrier to be electrically connected to the ground part and the feeding part.

7. The mobile communication device according to claim 5 further comprising:
   a second substrate, disposed in the chamber and opposite to the second surface of the antenna carrier with respect to the display direction, wherein the second substrate engages with the first substrate along the second surface of the antenna carrier.

8. The mobile communication device according to claim 7, wherein the system ground surface would be further disposed on the second substrate so that the ground part and the feeding part are electrically connected to the first substrate through the second substrate.

9. The mobile communication device according to claim 1, wherein a distance between the bending point and the border is between 5 mm and 8 mm.

10. The mobile communication device according to claim 1, wherein the first angle is 15°, and the second angle is 18°.

* * * * *